(12) United States Patent
Lamarque et al.

(10) Patent No.: US 10,298,324 B2
(45) Date of Patent: May 21, 2019

(54) FREE SPACE OPTICAL COMMUNICATIONS DEVICE

(71) Applicants: UNIVERSITÉ DE PICARDIE JULES VERNE, Amiens (FR); UNIVERSITE DE TECHNOLOGIE DE COMPIEGNE, Compiegne (FR); Centre National de la Recherche Scientifique (CNRS), Paris (FR)

(72) Inventors: Frederic Lamarque, Compiegne (FR); Christine Prelle, Compiegne (FR); Hani Al Hajjar, Compiegne (FR); Jeremy Terrien, Longueil-Annel (FR); Andreas Zeinert, Amiens (FR)

(73) Assignees: UNIVERSITÉ DE PICARDIE JULES VERNE, Amiens (FR); UNIVERSITE DE TECHNOLOGIE DE COMPIEGNE, Compiegne (FR); Centre National de la Recherche Scientifique (CNRS), Paris (FR)

( * ) Notice: Subject to any disclaimer, the term of this patent is extended or adjusted under 35 U.S.C. 154(b) by 0 days.

(21) Appl. No.: 15/562,504

(22) PCT Filed: Mar. 30, 2016

(86) PCT No.: PCT/EP2016/056954
§ 371 (c)(1),
(2) Date: Sep. 28, 2017

(87) PCT Pub. No.: WO2016/156427
PCT Pub. Date: Oct. 6, 2016

(65) Prior Publication Data
US 2018/0097563 A1 Apr. 5, 2018

(30) Foreign Application Priority Data
Mar. 30, 2015 (FR) ...................................... 15 52689

(51) Int. Cl.
*H04B 10/112* (2013.01)
*H04B 10/114* (2013.01)
*H04J 14/02* (2006.01)

(52) U.S. Cl.
CPC ..... *H04B 10/1123* (2013.01); *H04B 10/1127* (2013.01); *H04B 10/1143* (2013.01);
(Continued)

(58) Field of Classification Search
CPC .......................... H04B 10/112–10/1127; H04B 10/114–10/1143
See application file for complete search history.

(56) References Cited

U.S. PATENT DOCUMENTS 5,910,851 A 6/1999 Flaherty
6,025,942 A 2/2000 Scifres
(Continued)

FOREIGN PATENT DOCUMENTS

CA 2 308 000 A1 11/2001
DE 10 2006 055 156 A1 6/2008
(Continued)

OTHER PUBLICATIONS

International Search Report for PCT/EP2016/056954 dated Jul. 4, 2016 [PCT/ISA/210].
(Continued)

*Primary Examiner* — Shi K Li
(74) *Attorney, Agent, or Firm* — Sughrue Mion, PLLC

(57) ABSTRACT

The invention relates to a free space optical communications device (10) multiplexed in wavelengths of between 400 nm and 1600 nm, said device including demultiplexing means (11) that are designed so as to separately dissociate a number n1 of wavelengths from one another, the demultiplexing means (11) including one or more detectors (110) having a number n2 of optical filters (111) and active elements (112) which correspond to the number n1 of wavelengths, each active element (112) being arranged to selectively detect one wavelength from among said wavelengths ($I_d$ ... $\text{Å}n$) via an optical filter (111) separate from the active element (112)
(Continued)

Figure 1:
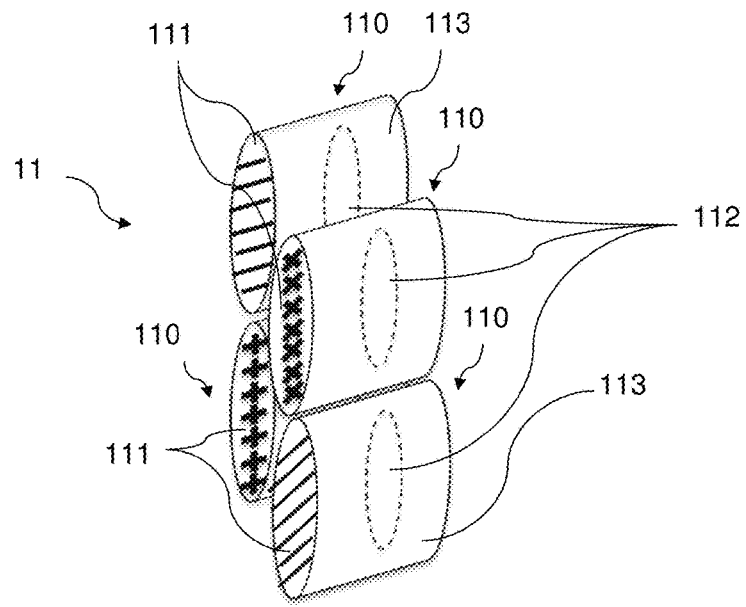

which is included in a housing (113), the optical filter (111) being in contact with a protection means (114), inserted between the optical filter (111) and the active element (112), said protection means (114) closing said housing (113).

17 Claims, 6 Drawing Sheets

(52) U.S. Cl.
CPC ...... *H04J 14/0208* (2013.01); *H04J 14/0216* (2013.01); *H04J 14/02* (2013.01)

(56) References Cited

U.S. PATENT DOCUMENTS

| | | | |
|---|---|---|---|
| 6,983,110 B2 * | 1/2006 | Buckman | ............... H04B 10/69 398/153 |
| 7,292,789 B1 | 11/2007 | Capots et al. | |
| 9,236,942 B1 * | 1/2016 | Roberds | ............... G02B 6/3816 |
| 2004/0151504 A1 | 8/2004 | Triebes et al. | |
| 2007/0031151 A1 | 2/2007 | Cunningham et al. | |
| 2009/0027658 A1 * | 1/2009 | Beausoleil | ......... H04B 10/1121 356/73 |

FOREIGN PATENT DOCUMENTS

| | | |
|---|---|---|
| EP | 0 378 148 A2 | 7/1990 |
| WO | 00/25433 A1 | 5/2000 |
| WO | 2010/148324 A1 | 12/2010 |

OTHER PUBLICATIONS

Written Opinion for PCT/EP2016/056954 dated Jul. 4, 2016 [PCT/ISA/237].

* cited by examiner

FREE SPACE OPTICAL COMMUNICATIONS DEVICE

CROSS REFERENCE TO RELATED APPLICATIONS

This application is a National Stage of International Application No. PCT/EP2016/056954 filed Mar. 30, 2016, claiming priority based on French Patent Application No. 1552689 filed Mar. 30, 2015, the contents of all of which are incorporated herein by reference in their entirety.

The present invention generally relates to optical communication devices in a free space, multiplexed in wavelength. More specifically, the invention relates to optical communication devices in a free space multiplexed in wavelengths comprised between 400 nm and 1,600 nm.

The present invention also relates to: free space multiplexed optical communication systems and in particular optical communication systems in free space, multiplexed in wavelengths comprised between 400 nm and 1,600 nm.

The invention also relates to multiplexed optical communication methods in free space and in particular optical communication methods in free space, multiplexed in wavelengths comprised between 400 nm and 1,600 nm.

Wireless communications are presently widely applied in radiofrequency bands (RF) through several techniques such as WiFi, Bluetooth, Zigbee and Ultra WideB and (UWB). These techniques give access to throughputs ranging up to a few hundred Megabits/second (Mbit/s) for systems considered as complicated to deploy. This type of communication is associated with several limitations, among which:

- the limitation of the bandwidth of the systems and subsequently of the transmitted throughput,
- electromagnetic interferences on the one hand between the different types of emitters and on the other hand between emitters and the different electronic modules (for example receivers).

An alternative solution which may give the possibility of doing without these limitations is the optical transmission communication in free space. This solution has several advantages and in particular the low cost of the used optical components (for fiber transmissions and for the illumination), and the security of the transmitted data. Indeed, in the case of a domestic use, it is impossible to detect the transmitted signal from outside a room and even to detect the transmitted signal in the case of the use of wavelengths which are not visible. This solution finally has an advantage in terms of sanitary immunity (no electromagnetic radiations).

In the field, an optical communication device in free space, multiplexed in wavelengths is already known, said device comprising demultiplexing means configured so as to distinctly dissociate a number of wavelengths from each other.

In particular, an optical communication system aiming at using a set of wavelengths simultaneously emitted in a parallel mode and grouped in a single light beam with the purpose of attaining throughputs greater than one Gbit/s. On reception, fiber components are used for separating the wavelengths. Such fiber components require an operation consisting of making an injection of the optical beam into an optical fiber in order to make possible the dissociation of each of the wavelengths, such an operation is made difficult by the accuracy with which an optical beam has to be injected into the optical fiber. Indeed, the inaccurate positioning of the fiber component would negatively affect the operation of the optical communication device. This accuracy constraint negatively affects the cost of operation of this optical communication system.

Further, it was seen that such an optical communication system was very sensitive to the outside environment and in particular to vibrations. Indeed, the layout of these components requires that there is no movement in the emitter or no relative movement between the emitter and the receiver. For example, a movement of the frame of the emitter generates a deviation in the emitting system, which causes the signal loss by the detector. The communication is then interrupted.

WDM multiplexing/demultiplexing known techniques in free space are only an adaptation of the traditional multiplexing/demultiplexing of the technical field of telecommunications in the C band (1530-1565 nm). These are multiplexing and demultiplexing techniques so called fiber techniques wherein the emitted signal leaves a fiber and is injected into a receiving optical fiber of a few micrometers in diameter. It was seen that the injection of the signal upon reception, in this optical fiber, generates a significant attenuation of the signal and imposes that the optical communication system is fixed in order not to lose the connection.

Known communication techniques in free space are based on communication systems using fiber components and find an application in the field of telecommunications between horizontal fixed points (communications between buildings) or vertical fixed points (ground-satellite communications).

In this context, the problem posed here is to propose an optical communication device in free space, multiplexed in wavelengths comprised between 400 nm and 1,600 nm, which are of a simple construction and allowing for a simplified circuit of the optical communication device to facilitate its application. More particularly, the problem aimed by the present invention is to reduce the cost related to the exploitation of such an optical communication device, while improving the dissociation of the wavelengths in a dynamic environment, including in an environment subject to vibrations. Improvement in the dissociation of the wavelengths is also targeted here when the optical communication device is movable relatively to another optical communication device.

The solution proposed by the present invention is that the demultiplexing means comprise one or several detectors having a number n2 of optical filters and of active elements corresponding to the number n1 of wavelengths, each active element being arranged for selectively detecting a wavelength from among said wavelengths ($\lambda 1 \ldots \lambda n$) via an optical filter distinct from the active element. The active element is comprised in a casing. The optical filter is in contact with the active element or a protective means interposed between the optical filter and the active element, said protective means containing said casing.

Such a communication device gives the possibility of overcoming the aforementioned drawbacks, in particular during its exploitation. Thus laid out, it is no longer necessary to make an injection into an optical fiber for allowing the demultiplexing of each of the wavelengths, the detector(s) carrying out this function. Indeed, the detectors have a number of optical filters and of active elements which correspond to the number of wavelengths to be dissociated. Each optical filter then fulfills a function for selecting a wavelength from among the wavelengths to be dissociated and each active element is able to convert the light to the selected wavelength through the optical filter into an electric signal.

These detectors moreover give the possibility of a more flexible operation of the device. As it is no longer dependent on complex mechanical structures or optical structures, the device does without structures particularly subject to the environmental conditions. Indeed, the multiplicity of the portions or combined elements in a way in order to fulfill the demultiplexing function are sensitive to the variations while the present demultiplexing means are robust and not very impacted by dynamic stresses such as vibrations. The vibration, which is a movement of a mechanical system close to a rest condition, may occur even if the optical communication device seems to be immobile relatively to its environment, then has a limited impact on the exploitation of the optical communication device. Thus, the optical communication device retains the signal although the wavelengths are slightly deviated, notably when it communicates with another optical communication device by sending said wavelengths towards the device according to the invention. These demultiplexing means therefore give the possibility of suppressing the constraint related to maintaining in a fixed position the optical communication device according to the invention or the emitting communication device with which the device according to the invention communicates.

The arrangement of an optical filter distinct from the active element and in contact with the latter gives the possibility of simplifying the construction of a detector by avoiding the interposition of other elements between the optical filter and the active element. The contact between the optical filter and the optical element for example gives the possibility of minimizing the dependency of the optical communication device towards the outer stresses.

When the optical filter is deposited on the active element or on the protective means interposed between the optical filter and the active element, the dynamic stresses to which the device is subject, have little impact on the quality of the detection.

Further, the proposed solution gives the possibility of communicating by receiving information or commands transmitted from a emitting device, independently of the telecommunication networks. This device may also be used in telecom networks especially at access networks for increasing the throughput or even provide a wireless connection without using any electromagnetic waves in the receiving area.

The device according to the invention uses wavelengths comprised between 400 and 1,600 nm. This spectrum, relatively wide relatively to the spectrum of wavelengths used in the prior art, gives the possibility of using more wavelengths, which increases the throughput of the communication.

In an embodiment, each optical filter is formed by a stack of thin layers deposited on the active element or on the protective means.

In an embodiment, the demultiplexing means comprise:
a detector comprising a plurality of optical filters associated with a plurality of active elements comprised in the casing, and/or
a plurality of detectors each comprising a single optical filter associated with a single active element each comprised in a casing.

In an embodiment, the active elements are photodiodes.

In an embodiment, the optical communication device comprises a first scanning device configured so as to detect the presence of a second optical communication device comprising a plurality of light emitters adapted for emitting the number n1 of wavelengths distinct from each other and multiplexing means for confusing said wavelengths on a same optical axis A, said demultiplexing means being fixed on the first scanning device and being configured for dissociating the wavelengths of said second optical communication device.

In an embodiment, the optical communication device comprises locomotion means.

In an embodiment, the protective means is configured so that the energy of a light wave having the selected wavelength via the optical filter and distributed on a first surface of the optical filter, is concentrated on a surface of the active element relatively smaller than said first surface.

In an embodiment, the optical communication device comprises:
a plurality of light emitters adapted for emitting said number n1 of wavelengths,
multiplexing means for confusing said wavelengths distinct from each other on a same optical axis B.

In an embodiment, the optical communication device comprises a second scanning device configured so as to emit said wavelengths confused on the same optical axis B towards a third optical communication device comprising demultiplexing means for dissociating said wavelengths, the multiplexing means of said optical communication device being fixed on the second scanning device.

In an embodiment, the first scanning device and the second scanning device comprise elementary multistable actuators configured so as to be electrically controlled by a control unit and in that the device comprises a communication module comprising:
a first function for searching a communication with another optical communication device, during which the multistable elementary actuators of said first scanning device and of said second scanning device are movable,
a second sleep function, when the communication is established, during which the multistable elementary actuators are immobile.

According to a second object of the invention, a system is also targeted which comprises:
at least one optical communication device according to one of the aforementioned embodiments,
a second optical communication device comprising a plurality of light emitters adapted for emitting the number n1 of wavelengths distinct from each other and multiplexing means for confusing said wavelengths on a same optical axis.

In an embodiment, the system comprises:
at least one first optical communication device according to one of the embodiments comprising a plurality of light emitters adapted for emitting said number n1 of wavelengths and multiplexing means for confusing said wavelengths distinct from each other on a same optical axis B,
a second optical communication device comprising a plurality of light emitters adapted for emitting the number n1 of wavelengths distinct from each other and multiplexing for confusing said wavelengths on a same optical axis A,
a third optical communication device comprising demultiplexing means for distinctly dissociating the number n1 of wavelengths from each other,
said third device being configured for detecting said wavelengths emitted by said first or second optical communication device In an embodiment, the whole of the optical communication devices comprises respective locomotion means for making them movable relative to each other.

According to a third object of the invention, an optical communication method in free space, multiplexed in wavelengths comprised between 400 nm and 1,600 nm is also targeted comprising the following steps:

emission, by a second optical communication device, of a number n1 of wavelengths confused on a same optical axis A, detection, by a first optical communication device, of the number n1 of wavelengths by means of one or several detectors having a number n2 of optical filters and of active elements corresponding to the number n1 of wavelengths, each active element being arranged for selectively detecting a wavelength from among said wavelengths via an optical filter distinct from the active element which is comprised in a casing, the optical filter being in contact:

with the active element, with a protective means interposed between the optical filter and the active element, said protective means (114) containing said casing.

In an embodiment, the method comprises the following steps:

emission, by said first device, of the number n1 of wavelengths towards a third optical communication device, detection, by said second and/or third optical communication device, of the number n1 of wavelengths.

In an embodiment, the first device, the second device and the third device are movable between each other, the method further comprising the following steps:

detection by scanning, by the first device, of the presence of the second optical communication device, detection by scanning, by the third device, of the presence of the first device.

In an embodiment, the scanning is carried out by means of multistable actuators controlled by a control unit, the method comprising during the detection by scanning, by the first device, of the presence of at least one of the second and third optical communication devices, steps of:

moving the multistable actuators until establishment of a communication with the at least one of the second and third optical communication devices, maintaining immobile the multistable actuators when the detection by the first communication device of the number n1 of wavelengths emitted by the at least one of the second and third optical communication devices is finished, again moving the multistable actuators after a predetermined period.

Figure 2A:
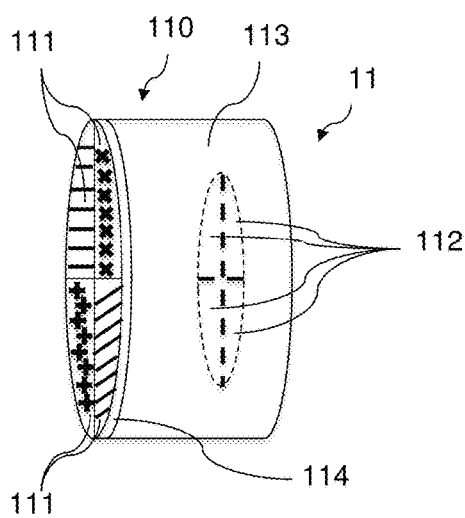
Figure 2B:
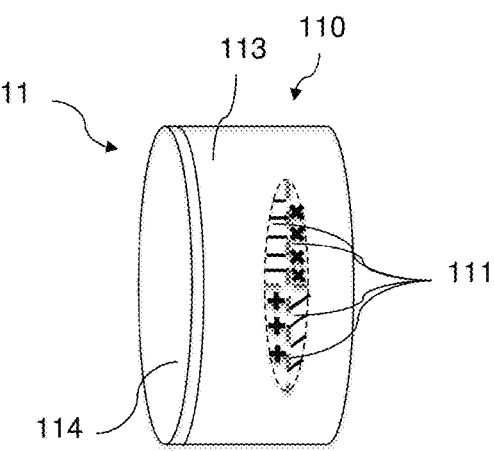
Figure 3:
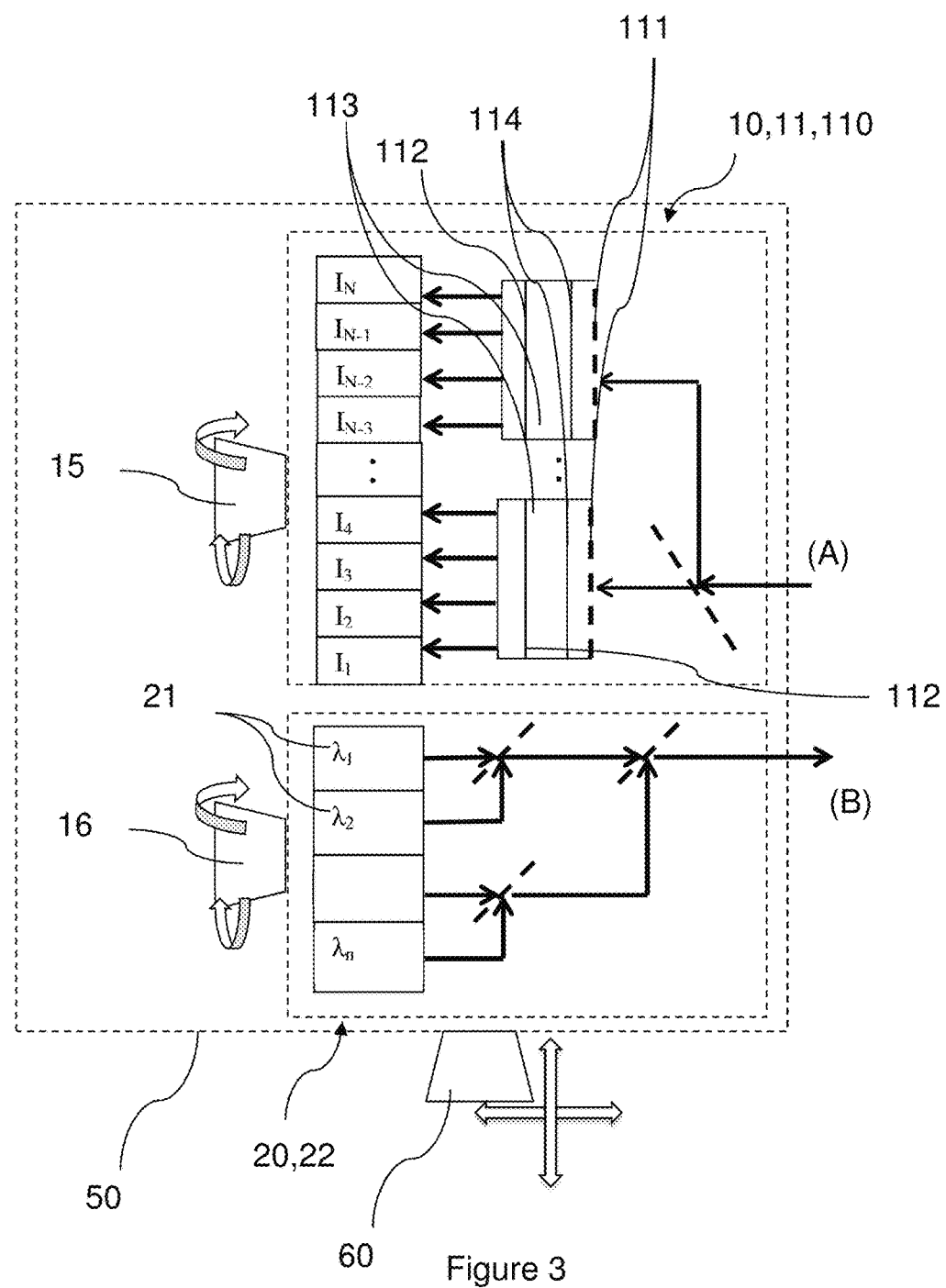
Figure 4:
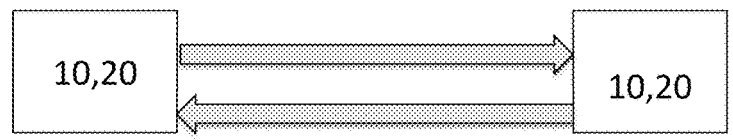
Figure 5:
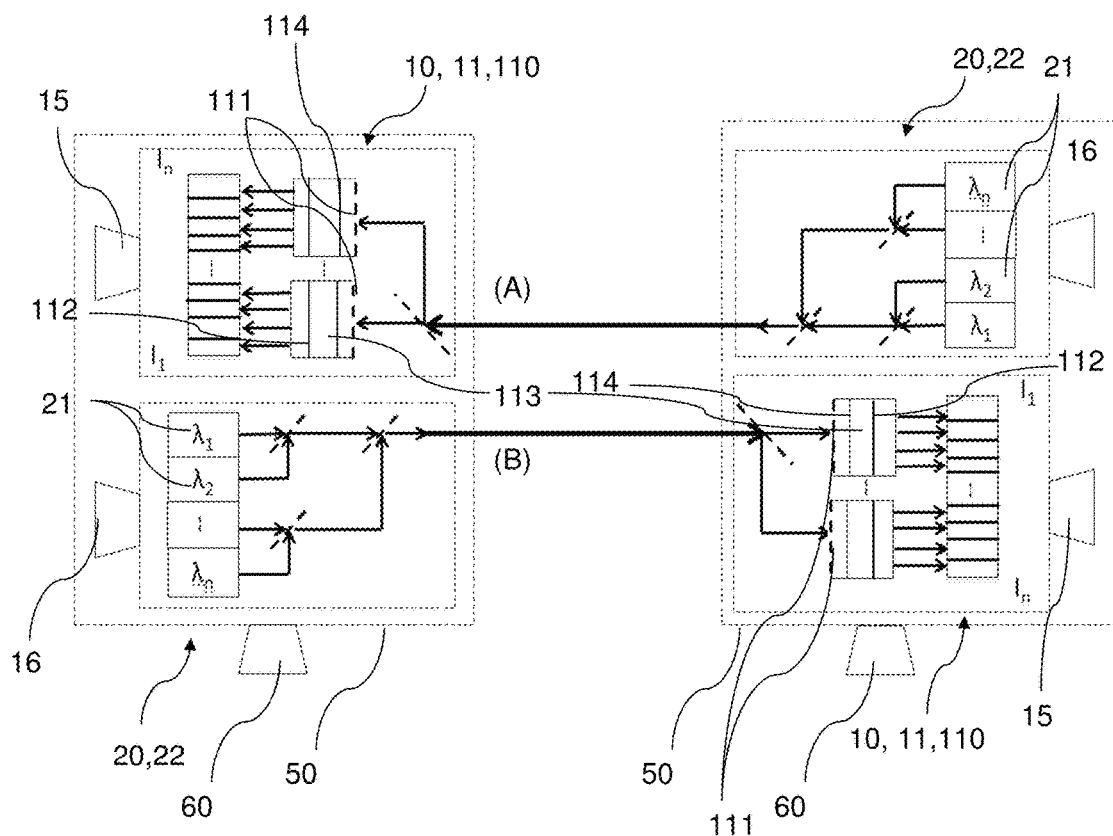

Other features and advantages will further emerge from the description which is made hereafter as an indication and by no means as a limitation, with reference to the appended drawings, wherein:

FIG. 1 illustrates a schematic illustration of an exemplary embodiment of the device comprising a plurality of detectors, FIG. 2a illustrates a schematic illustration of an exemplary embodiment of the device comprising a single detector comprising a plurality of optical filters associated with a plurality of active elements comprised in the casing, the optical filter being in contact with a protective means interposed between the optical filter and the active element, FIG. 2b illustrates a schematic illustration of an exemplary embodiment of the device comprising a single detector comprising a plurality of optical filters associated with a plurality of active elements comprised in the casing, the optical filter being in contact with the active element, FIG. 3 represents an operating diagram of an exemplary embodiment of a system applying the optical communication device according to the invention, FIGS. 4 and 5 represent operating block diagrams of an exemplary embodiment of a bidirectional optical communication system applying the optical communication device according to the invention.

Figure 6:
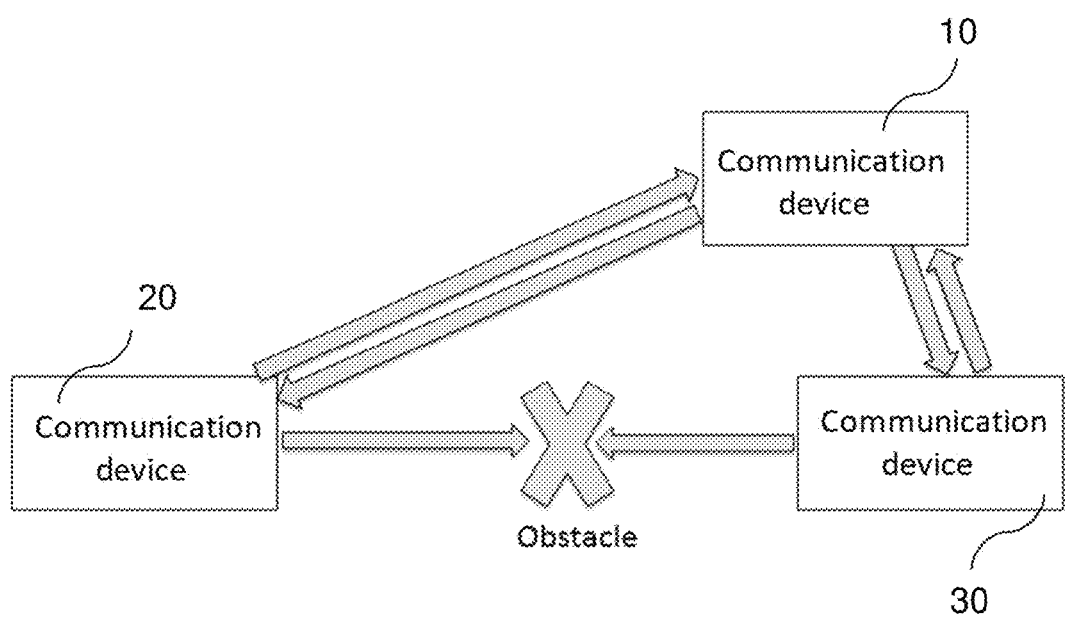
Figure 7:
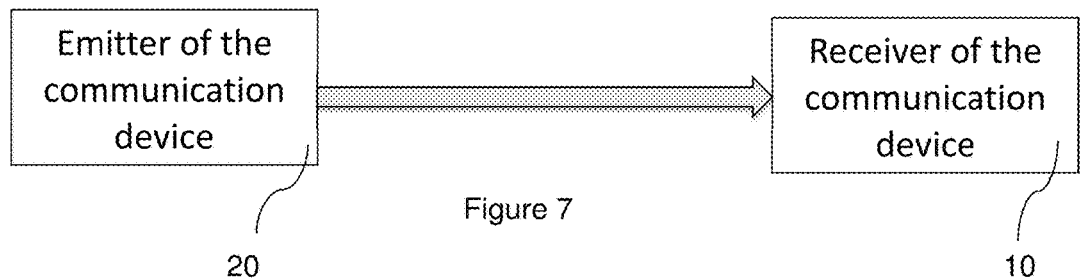
Figure 8:
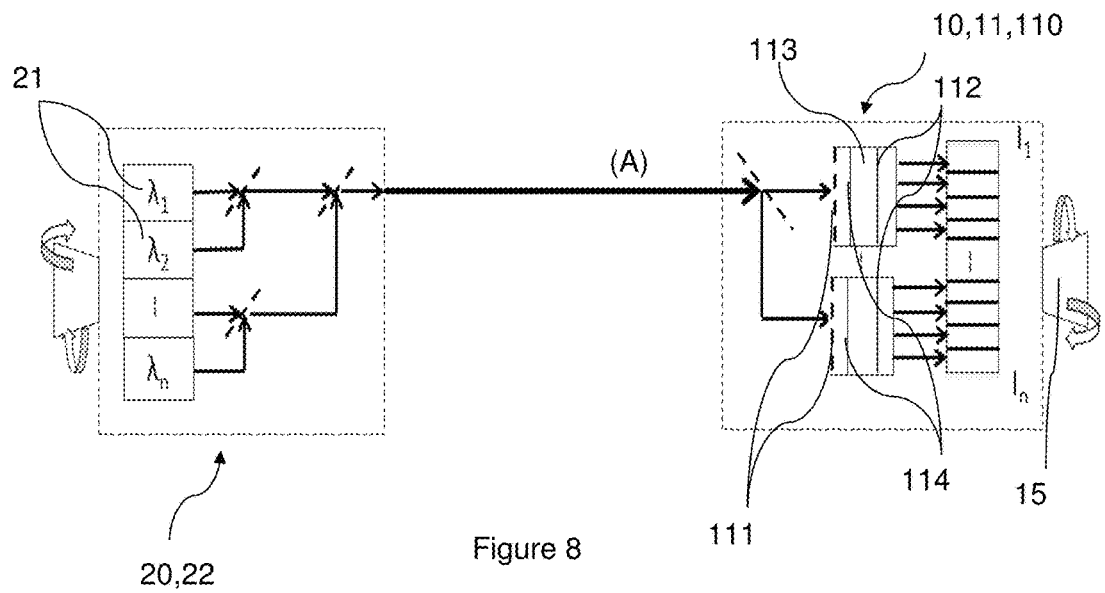
Figure 9:
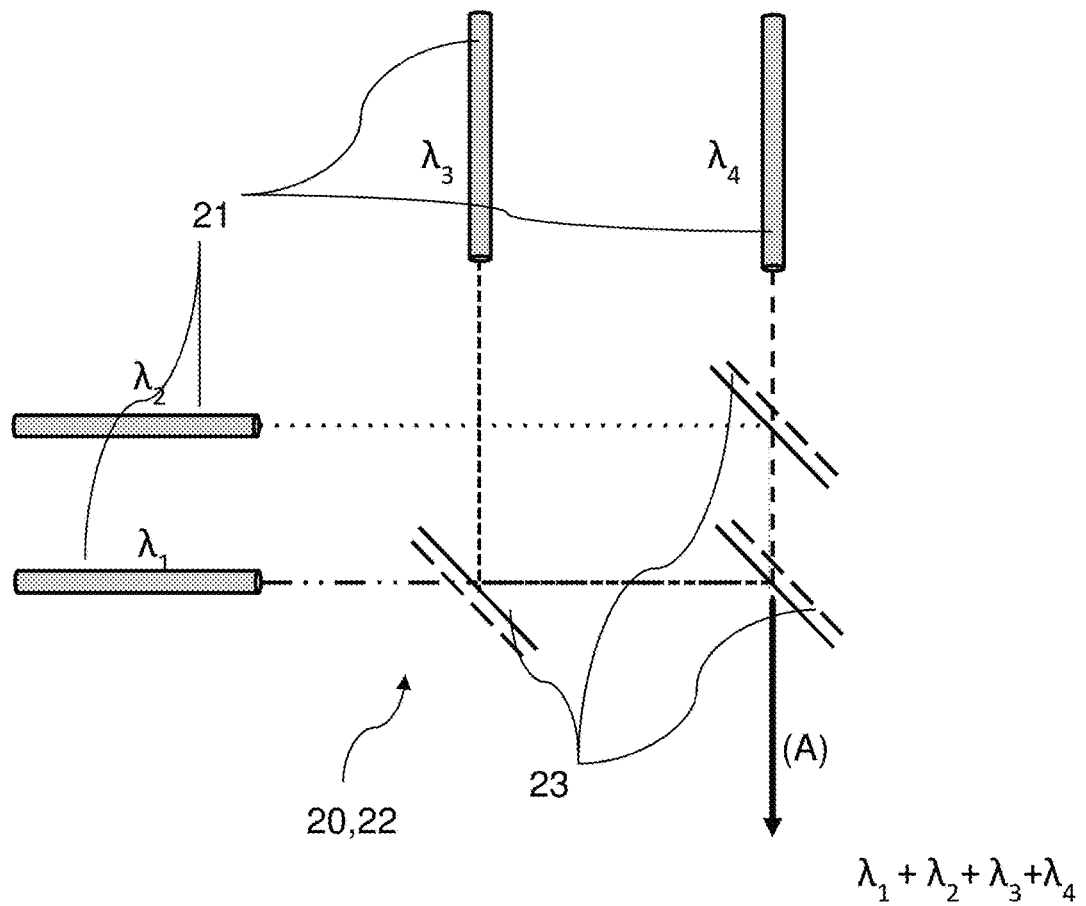

FIG. 6 represents an operating diagram of another exemplary embodiment applying the optical communication device according to the invention, FIGS. 7 and 8 represent block diagrams of the operation of another exemplary embodiment of an mono-directional optical communication system applying the optical communication device according to the invention, FIG. 9 illustrates an exemplary embodiment of an optical emission device comprising a plurality of light emitters adapted for emitting the number of wavelengths distinct from each other and multiplexing means for confusing said wavelengths on a same optical axis.

In FIGS. 3 to 8, is illustrated an optical communication device 10 in free space multiplexed in wavelengths comprised between 400 nm and 1,600 nm. The device 10 comprises demultiplexing means 11 configured so as to distinctly dissociate a number n1 of wavelengths from each other. Conventionally, this number n1 of wavelengths is emitted through a second optical communication device 20, on a same optical axis A (FIG. 9). This second device 20 acts as a emitter of wavelengths.

The demultiplexing means 11 comprise one or several detectors 110 having a number n2 of optical filters 111 and active elements 112 corresponding to the number n1 of wavelengths. Each active element 112 is laid out for selectively detecting a wavelength from among said wavelengths to be dissociated via an optical filter 111. The active element 112 is distinct from the optical filter. In other words, in the alternatives illustrated in FIGS. 1.2a.2b, the active element 112 defines a portion which is physically separated from the optical filter 111 before the mounting of the active element 112 and of the optical filter in the detector. After its mounting, the optical element 112 and the optical filter 111 are always separated physically and considered as distinct. The optical filter 111 is then in contact with the active element 112 (FIG. 2b) or with a protective means 114 which is interposed between the optical filter 111 and the active element 112 (FIG. 2a). When the optical filter 111 is deposited on the protective means 114, this protective means 114 contains the casing 113. In other words, the optical filter 111 is deposited on the active element 112 or on the protective means 114. In particular, as the optical filter 111 is deposited on the active element 112 or on the protective means 114, a construction simplification results therefrom and a less strong angular dependency which may be due to outer stresses.

Following the filtering of the wavelengths by the optical filter 111, the active element 112 acts for converting the optical signal to a given wavelength into an electric signal. The electric signal may then be treated for recovering the transmitted information.

According to the embodiment illustrated in FIGS. 1 and 2a, the active element 112 comprises a protective means 114, conventionally called a protective glass. In this case, the optical filter 111 is deposited in contact with this protective means 114. The protective means 114 is laid out for closing the casing 113. The protective means 114 may be included in the casing 113 comprising the active element 112. Alternatively, as shown in FIG. 2a, the protective means 114 is fixed on the edge of the casing 113 so as not to be included in the casing and to close the opening of the casing 113 in which the active element 112 is comprised. This structure is advantageous in that it gives the possibility of not damaging the active element 112 during a plasma deposition method which is a preferential assembling method for the deposition of optical filters 111. This protective means moreover gives the possibility of avoiding the problem of adhesion of the thin layers on the active element 112. For example, thin layers are defined as layers having thicknesses comprised between 100 nanometers and 1 micrometer.

In an embodiment, the protective means 114 is configured so that the energy of a light wave having the selected wavelength (λ1 . . . λn) via the optical filter 111 and distributed on a first surface of the optical filter 111, is concentrated on a surface of the active element 112 relatively smaller than said first surface. In other words, the protective means 114 comprises a means for concentrating the light received by the active element 112. When the detector 110 comprises a plurality of optical filters 111 associated with a plurality of active elements 112 comprised in the casing 113 (FIGS. 2a and 2b), the protective means 114 may comprise several portions facing the optical filters 111 distributed on the protective means 114 for concentrating the light wave of each of these selected wavelengths (λ1 . . . λn) on the corresponding active elements 112. Each of the portions of this protective means 114 is then able to concentrate the distributed energy on the first surface of the optical filter 111 on the second surface of the corresponding active element 112. Alternatively, when the device comprises a plurality of detectors 110 each comprising a single optical filter 111 associated with a single active element each comprised in a casing 113 (FIG. 1), one or each of the protective means 114 comprises a single portion configured so that the energy of a light wave having the selected length (λ1 . . . λn) via the optical filter 111 and distributed on a first surface of the optical filter 111 is concentrated on a second surface of the active element 112 relatively smaller than said first surface. This configuration advantageously gives the possibility of increasing the power of the detected signal, in particular in a dynamic environment.

Preferentially, the active elements 112 are photodiodes.

In an embodiment illustrated in FIGS. 1 and 2, the optical filters 111 are formed by a stack of thin layers deposited on the active element 112 or on the protective means 114 containing said casing 113.

In an embodiment illustrated in FIG. 1, the demultiplexing means 11 comprise a plurality of detectors 110 comprising a casing 113 in which a single optical filter 111 is associated with a single active element 112. Preferably, the active elements 112 are formed by photodiodes with a single conversion surface, each of the optical filters 111 having a capability of selecting a predetermined wavelength. As an example, FIG. 1 illustrates four optical filters 111 and four active elements 112 distinct from each other. Each of the optical filters 111 only filtering one of these four wavelengths. A first optical filter 111 only filters λ1, a second optical filter 111 only filters λ2, a third optical filter 111 only filters λ3, a fourth optical filter 111 only filters λ4 etc. . . . . The number of detectors 110 may be adapted according to the number of wavelengths n1 to be dissociated. In particular, the number of detectors 110 equipped with a single optical filter 111 and with a single active element 112 may be adapted to the number of emitters 21 of the second optical communication device 20 illustrated in FIG. 9. It was seen that the embodiment of FIG. 1 having advantageously a higher cutoff frequency than the alternatives illustrated in FIGS. 2a and 2b.

In the embodiments shown in FIGS. 2a and 2b, the detector 110 comprises a common casing 113 wherein a plurality of optical filters 111 is associated with a plurality of active elements 112. Preferably, the plurality of active elements 112 is formed by a multi-dial photodiode made to be selective in wavelengths by depositing a plurality of optical filters distributed on the protective means 114 (FIG. 2a) or directly on the multi-dial photodiode (FIG. 2b). The FIGS. 2a and 2b for example illustrate a photodiode comprising a plurality of active elements 112. These active elements 112 are distributed in a casing 113, for example per quarter when the number n1 of wavelengths to be dissociated for a detector 110 is equal to four. In the same way as for the embodiment of FIG. 1, are illustrated in FIG. 2a, a first filter deposited on the protective glass 114 only filtering λ1, a second filter deposited on this same protective glass 114 defining a second optical filter 111 only filtering λ2, a third filter deposited on this same protective glass 114 defining a third optical filter 111 only filtering λ3 etc. The number of detectors 110 equipped with optical filters distributed on the protective means 114 and the plurality of active elements formed by a multi-dial photodiode may be adapted according to the number of wavelengths n1 to be dissociated. In particular, the number of detectors may be adapted to the number of emitters 21 of the second optical communication device 20 illustrated in FIG. 9.

As indicated above, the device 1 is intended to communicate with other optical communication devices. In particular, it is advantageously in communication with an optical communication device which comprises: a plurality of light emitters 21 adapted for emitting the number n1 of wavelengths and multiplexing means 22 for confusing said wavelengths distinct from each other on a same optical axis (FIG. 9). The wavelengths coincide on a same optical axis by means known to one skilled in the art, i.e. a plurality of emitters 21 each emitting a wavelengths λ1 . . . λn, dichroic mirrors 23 and an arrangement of emitters 21 and of dichroic mirrors 23 configured so as to confuse the different wavelengths emitted by the device 20 illustrated in FIG. 9. In an embodiment illustrated in FIG. 3, the optical communication device according to the invention also comprises a plurality of light emitters 21 adapted for emitting the number n1 of wavelengths and of multiplexing means 22 for confusing said wavelengths distinct from each other on a same optical axis B.

FIG. 8 illustrates the operating diagram of a device 10 according to the invention associated with a communication device 20 emitting wavelengths such as the one illustrated in FIG. 9. FIG. 3 shows that the emitters 21 of wavelengths which are preferably lasers, each emit wavelengths λ1 . . . λn which are confused on the same optical axis A via multiplexing means 22 preferably having the architecture shown in FIG. 9. The number n1 of wavelengths confused on the optical axis A forms a multi-wavelength beam emitted towards the communication device 10 according to the present invention. The demultiplexing means 11 illustrated as an example in FIGS. 1 and 2 are laid out so as to receive the multi-wavelength beam emitted by the emitter device 20 like the one illustrated in FIG. 9 so that the wavelengths are dissociated distinctly. Accordingly, upstream from the demultiplexing means 11, the wavelengths are confused on the same optical axis A, and, downstream from the demultiplexing means 11, the wavelengths are dissociated so as to notably select signals which are used as flows of information.

In an embodiment, the communication device 10 comprises a first scanning device 15 configured so as to detect the presence of a second optical communication device 20 (see for example FIG. 9) comprising a plurality of light emitters 21 adapted for emitting the number n1 of wavelengths distinct from each other and multiplexing means 22 for confusing said wavelengths on the same optical axis A. The demultiplexing means 11 are fixed on the first scanning device 15 and are configured for dissociating the wavelengths of said second optical communication device 20.

FIG. 3, when the communication device 10 comprises additionally a plurality of light emitters 21 adapted for emitting said number n1 of wavelengths and multiplexing means 22 for confusing said wavelengths distinct from each other on a same optical axis B, the device 10 may further comprise a second scanning device 16 configured so as to emit said wavelengths confused on the same optical axis B towards a third optical communication device 30. The third communication device 30 comprises demultiplexing means for dissociating the wavelengths stemming from the device 1.

As shown in FIG. 3, the optical communication device 10 comprising the demultiplexing means 11 according to the invention and the communication device 20 emitting wavelengths like the one illustrated in FIG. 9 may be mounted on a common chassis 50. This chassis 50 may be equipped with the first scanning device 15 or with the second scanning device 16 according to the needs, i.e. detecting the presence of another optical communication device or emitting the wavelengths confused towards another optical communication device in order to orient the beam.

In an embodiment, the optical communication device comprises locomotion means 60. These locomotion means may be propulsion means, traction means, all means allowing displacement of the device relatively to the ground.

The orientation of the optical communication devices 10, whether they are in a detection mode or emission mode, becomes imperative in the case when there are several optical communication devices which are movable relatively to each other, which is the case when at least one of these devices 10 comprises locomotion means 60. An example of application of these optical communication devices is their mounting on drones. A plurality of drones each equipped or for some of them with an optical communication device 10 then forms a formation of drones which communicate together. When they are equipped with the first scanning device 15 and/or with the second scanning device 16, the drones thereby equipped with optical communication devices 10 have the capability of finding (or tracing) the other drones in order to communicate with them. The solution according to which the demultiplexing means 11 are laid out according to the configurations illustrated in FIGS. 1, 2a, 2b, is then particularly advantageous, since these demultiplexing means 11 are less sensitive to vibrations and relative movements between a device 10 which detects and another device which emits (see FIGS. 5 and 8).

The value of the throughput targeted by the present communication method, i.e. greater than 1 Gbit/s, imposes a high signal-to-noise ratio. The optical power detected by the device 10 is therefore maximized via the presence of a first 15 and/or a second scanning device 16. The losses in free space are minimized by means of the layout of these first 15 and/or second scanning devices 16 equipping the device 10 which requires transmission with low divergence. Moreover, such optical communication devices are constraint by sanitary aspects. More specifically, in the case of a human presence in the proximity of the optical communication devices, in particular when they are movable, it is imperative to limit the power emitted by the emitters of wavelengths in order to observe the ocular safety in effect. The power required for the emitters of wavelengths is according less.

In a preferred embodiment, the first scanning device 15 and the second scanning device 16 comprise multistable elementary actuators configured so as to be electrically controlled by a control unit. These actuators are advantageous since they have intrinsic mechanical stability. The device may further comprise a communication module comprising:
 a first function for seeking communication with another opticalcommunication device 10, 20, 30, during which the multistable elementary actuators of said first scanning device 15 and of said second scanning device 16 are movable,
 a second sleep function when the communication is established, during which the multistable elementary actuators are immobile.

This layout has the advantage of consuming the right amount of energy at the appropriate moment, i.e. during the search for communication with another optical communication device.

In a second object of the invention illustrated in FIGS. 7 and 8, a system is also targeted which comprises:
 at least the optical communication device 10 according to one of the aforementioned embodiments,
 the second optical communication device 20 comprising the plurality of light emitters 21 adapted for emitting the number n1 of wavelengths distinct from each other and the multiplexing means 22 for confusing said wavelengths on the same optical axis A.

In a third object of the invention schematically illustrated in FIG. 6, also targeted by at least one system which comprises:
 the first optical communication device 10 according to one of the aforementioned embodiments wherein the communication device 10 comprises a plurality of light emitters 21 adapted for emitting said number n1 of wavelengths and multiplexing means 22 for confusing said wavelengths distinct from each other on the same optical axis B,
 a second optical communication device 20 comprising a plurality of light emitters adapted for emitting the number n1 of wavelengths distinct from each other, and multiplexing means for confusing said wavelengths on the same optical axis A.
 a third optical communication device 30 comprising demultiplexing means for distinctly dissociating the number n1 of wavelengths from each other,
 said third device 30 being configured for detecting said wavelengths emitted by said first or second optical communication device 10, 20.

Advantageously, this gives the possibility of operating the optical communication devices 10, 20, 30 in a network in order to minimize the optical power of the devices which are equipped with emitters. Indeed, an optical communication device does not necessarily communicate directly with all the other systems, but only with those found in proximity or those with which the device is not separated by an obstacle on the most direct optical path between both optical communication devices. In FIG. 6, is shown a system or network of optical communication devices wherein two optical communication devices 20, 30 need to communicate via another optical communication device 10, since both devices 20, 30 are separated by an obstacle located on the optical path. This principle also operates when a communication device 20 intends to establish a communication with another optical communication device 30 which is then out of range; in this case, an indirect communication may be established with the communication device 30 which is out of range via the optical communication device 10 which is for example located between two aforementioned communication devices 20, 30. An identification procedure may then be applied in the case of a network comprising a multiplicity of optical communication devices.

Equipped with optical communication devices 10 according to the invention, these systems have several advantages such as a significant communication throughput which may exceed one Gbit/s, the low cost of optical components used for fiber transmissions and for the illumination and safety of the transmitted data via the low divergence transmission and the range of used wavelengths, the safety of the data being increased if an identification procedure is applied. For example, in the case of the use of such a system in a domestic environment, it is difficult or even impossible to detect the transmitted signal from a room which is located outside the room in which is located an optical communication device 10, these rooms being separated by a wall forming an obstacle.

As regards the safety of the transmitted data, and in particular the confidentiality and the integrity of the transmitted data, it is possible to encode the signal by combining said wavelengths. Such an arrangement advantageously gives the possibility of encrypting the data. The predetermined combination of these wavelengths allows the transmission of binary words rather than simple trains of bits. More specifically, the use of correspondence tables gives the possibility of again finding the meaning of the signal once the latter is detected by the demultiplexing means 11. In an embodiment, it is possible to modulate (notably in amplitude or in a temporal way) the optical signal emitted by the multiplexing means 22 in order to obtain high throughput transmission goals or safety transmission goals according to the targeted application.

In an embodiment, the whole of the optical communication devices 10, 20, 30 comprise respective locomotion means 60 so as to make them movable between each other.

According to a fourth object of the invention, an optical communication method in free space, multiplexed in wavelengths comprised between 400 nm and 1,600 nm is also targeted comprising the following steps:
emission, by the second optical communication device 20 of a number n1 of wavelengths confused on the same optical axis A,
detection, by the first optical communication device 10, of the number n1 of wavelengths by means of one or several detectors 110 comprising a number of optical filters 111 and active elements 112 corresponding to the number n1 of wavelengths, each active element 112 being arranged for selectively detecting a wavelength from among said wavelengths via an optical filter 111 distinct from the active element 112 which is comprised in a casing 113, the optical filter being in contact with the active element or the protective means 114 interposed between the optical filter 111 and the active element 112, said protective means 114 containing said casing 113.

In an embodiment, the method further comprises the following steps:
emission, by said first device 10, of the number n1 of wavelengths towards the third optical communication device 30,
detection, by said second and/or third optical communication device 20, 30, of the number n1 of wavelengths.

In an embodiment, the first device 10, the second device 20 and the third device 30 are movable between them, the method further comprising the following steps:
detection by scanning, by the first device 10, of the presence of the second optical communication device 10,
detection by scanning, by the third device 30, of the presence of the first device 10.

In an embodiment, the scanning is carried out by means of multistable actuators controlled by a control unit, the method comprising during the detection by scanning, by the first device 10, of the presence of at least one of the second and third optical communication devices 20, 30, of the steps of:
moving the bistable actuators until establishment of a communication with at least one of the second and third optical communication devices 20, 30,
maintaining immobile the bistable actuators when the detection by the first communication device 10 of the number n1 of wavelengths emitted by the at least one of the second and third optical communication devices 20, 30 is finished,
again moving the bistable actuators after a predetermined period.

The invention claimed is:

1. An optical communication device (10) in free space, multiplexed in wavelengths comprised between 400 nm and 1,600 nm, said device comprising demultiplexing means (11) configured so as to distinctly dissociate a number n1 of wavelengths from each other, the demultiplexing means (11) comprising one or several detectors (110) having a number n2 of optical filters (111) and active elements (112) corresponding to the number n1 of wavelengths, each active element (112) being arranged for selectively detecting a wavelength from among said wavelengths ($\lambda 1 \ldots \lambda n$) via an optical filter (111) distinct from the active element (112) which is comprised in a casing (113), the optical filter (111) being in contact with a protective means (114) interposed between the optical filter (111) and the active element (112), said protective means (114) containing said casing (113).

2. The device (10) according to claim 1, characterized in that each optical filter (111) is formed by a stack of thin layers deposited on the protective means (114).

3. The device (10) according to claim 1, characterized in that the demultiplexing means (11) comprise:
a detector (110) comprising a plurality of optical filters (111) associated with a plurality of active elements (112) comprised in the casing (113), and/or
a plurality of detectors (110) each comprising a single optical filter (111) associated with a single active element each comprised in a casing (113).

4. The device (10) according to claim 1, characterized in that the active elements (112) are photodiodes.

5. The device (10) according to claim 1, characterized in that it comprises a first scanning device (15) configured so as to detect the presence of a second optical communication device (20) comprising a plurality of light emitters adapted for emitting the number n1 of wavelengths distinct from each other and multiplexing means (22) for confusing said wavelengths on a same optical axis A, said demultiplexing means (11) being fixed on the first scanning device (15) and being configured for dissociating the wavelengths of said second optical communication device (20).

6. The device (10) according to claim 5, characterized in that it comprises locomotion means (60).

7. The device (10) according to claim 1, characterized in that the protective means (114) is configured so that the energy of a light wave having the selected wavelength (λ1 ... λn) via the optical filter (111) and distributed on a first surface of the optical filter (111) is concentrated on a surface of the active element (112) relatively smaller than said first surface.

8. The device (10) according to claim 5, characterized in that it comprises:
a plurality of light emitters (21) adapted for emitting said number n1 of wavelengths,
multiplexing means (22) for confusing said wavelengths distinct from each other on a same optical axis B.

9. The device (10) according to claim 8, characterized in that it comprises a second scanning device (16) configured so as to emit said wavelengths confused on the same optical axis B towards a third optical communication device (30) comprising demultiplexing means (11) for dissociating said wavelengths, the multiplexing means (22) of said optical communication device being fixed on the second scanning device.

10. The device (10) according to claim 5, characterized in that the first scanning device (15) and the second scanning device (16) comprise multistable elementary actuators configured so as to be electrically controlled by a control unit and in that the device comprises a communication module comprising:
a first function for searching a communication with another optical communication device, during which the multistable elementary actuators of said first scanning device (15) and of said second scanning device are movable,
a second sleep function, when the communication is established, during which the multistable elementary actuators are immobile.

11. A system characterized in that it comprises:
at least one optical communication device (10) according to claim 1,
a second optical communication device (20) comprising a plurality of light emitters (21) adapted for emitting the number n1 of wavelengths distinct from each other and multiplexing means (22) for confusing said wavelengths on a same optical axis.

12. The system characterized in that it comprises:
at least one first optical communication device according to claim 8,
a second optical communication device (20) comprising a plurality of light emitters (21) adapted for emitting the number n1 of wavelengths distinct from each other and multiplexing means (22) for confusing said wavelengths on a same optical axis A,
a third optical communication device (30) comprising demultiplexing means (11) for distinctly dissociating the number n1 of wavelengths from each other, said third device (30) being configured for detecting said wavelengths emitted by said first or second optical communication device (10, 20).

13. The system according to claim 11, characterized in that the whole of the optical communication devices (10, 20, 30) comprises respective locomotion means for making them movable relative to each other.

14. An optical communication method in free space, multiplexed in wavelengths comprised between 400 nm and 1,600 nm comprising the following steps:
emission, by a second optical communication device (20), of a number n1 of wavelengths confused on a same optical axis A,
detection, by a first optical communication device (10), of the number n1 of wavelengths by means of one or several detectors (110) having a number n2 of optical filters (111) and of active elements corresponding to the number n1 of wavelengths, each active element being arranged for selectively detecting a wavelength from among said wavelengths via an optical filter (111) distinct from the active element (112) which is comprised in a casing (113), the optical filter being in contact with a protective means (114) interposed between the optical filter (111) and the active element (112), said protective means (114) containing said casing (113).

15. The method according to claim 14, characterized in that it comprises the following steps:
emission, by said first device (10), of the number n1 of wavelengths towards a third optical communication device (30),
detection, by said second and/or third optical communication device (20, 30) of the number n1 of wavelengths.

16. The method according to claim 15, characterized in that the first device (10), the second device (20) and the third device (30) are movable between each other, the method further comprising the following steps:
detection by scanning, by the first device (10), of the presence of the second optical communication device (20),
detection by scanning, by the third device (30), of the presence of the first device (10).

17. The method according to claim 16, characterized in that the scanning is carried out by means of multistable actuators controlled by a control unit, the method comprising during the detection by scanning, by the first device (10), of the presence of at least one of the second and third optical communication devices (20, 30), steps of:
moving the multistable actuators until establishment of a communication with the at least one of the second and third optical communication devices (20, 30),
maintaining immobile the multistable actuators when the detection by the first communication device of the number n1 of wavelengths emitted by the at least one of the second and third optical communication devices (20, 30) is finished,
again moving the multistable actuators after a predetermined period.

* * * * *